(12) United States Patent
Flores et al.

(10) Patent No.: US 8,458,713 B2
(45) Date of Patent: Jun. 4, 2013

(54) METHOD, SYSTEM, AND APPARATUS FOR ALLOCATING RESOURCES TO A SOFTWARE CONFIGURABLE COMPUTING ENVIRONMENT

(75) Inventors: Romelia H. Flores, Keller, TX (US); Leonard S. Hand, Red Creek, NY (US); Biao Hao, Bedford, TX (US)

(73) Assignee: International Business Machines Corporation, Armonk, NY (US)

( * ) Notice: Subject to any disclaimer, the term of this patent is extended or adjusted under 35 U.S.C. 154(b) by 2151 days.

(21) Appl. No.: 10/974,163

(22) Filed: Oct. 27, 2004

(65) Prior Publication Data

US 2006/0089922 A1 Apr. 27, 2006

(51) Int. Cl.
*G06F 9/46* (2006.01)
(52) U.S. Cl.
USPC .......................................... 718/104
(58) Field of Classification Search
USPC ............................................ 718/104
See application file for complete search history.

(56) References Cited

U.S. PATENT DOCUMENTS

| | | | |
|---|---|---|---|
| 5,202,987 A | 4/1993 | Bayer et al. | |
| 5,682,530 A | 10/1997 | Shimamura | |
| 5,724,556 A * | 3/1998 | Souder et al. | 703/2 |
| 5,748,468 A | 5/1998 | Notenboom et al. | |
| 6,088,678 A | 7/2000 | Shannon | |
| 6,256,773 B1 * | 7/2001 | Bowman-Amuah | 717/121 |
| 6,321,373 B1 | 11/2001 | Ekanadham et al. | |
| 6,772,350 B1 * | 8/2004 | Belani et al. | 726/2 |
| 7,140,020 B2 * | 11/2006 | McCarthy et al. | 718/104 |
| 8,065,618 B2 * | 11/2011 | Kumar et al. | 715/736 |
| 2002/0007389 A1 * | 1/2002 | Jones et al. | 709/104 |
| 2002/0156824 A1 | 10/2002 | Armstrong et al. | |
| 2002/0188765 A1 | 12/2002 | Fong et al. | |
| 2003/0120776 A1 | 6/2003 | Avvari et al. | |
| 2003/0140179 A1 | 7/2003 | Wilt et al. | |
| 2003/0158887 A1 | 8/2003 | Megiddo | |
| 2004/0194098 A1 | 9/2004 | Chung et al. | |
| 2005/0050085 A1 * | 3/2005 | Shimada et al. | 707/102 |

OTHER PUBLICATIONS

Collier, W.W., "Deadlock-Free Resource Allocation in Networks", IBM Tech. Disci. Bull., vol. 14, No. 12, pp. 3660-3663, (May 1972).
"Process Control Executive—A New Paradigm for Operating System Design", IBM Tech. Disci. Bull., vol. 32, No. 12, pp. 414-419, (May 1990).
Walter, P.R., et al., "Modelling & Simulation", European Simulation MultiConf., Proc. of ESM '95, pp. 675-681, (Jun. 5-7, 1995).
Palencia-Gutierrez, J.C., et al., "Best-Case Analysis for Improving Worst-Case Schedulability Test for Distributed Hard Real-Time Systems", 10th Proc. Euromicro, (Jun. 1998).

(Continued)

*Primary Examiner* — Mengyao Zhe
(74) *Attorney, Agent, or Firm* — Novak Druce Connolly Bove + Quigg LLP

(57) ABSTRACT

A unit for defining resources for a software configurable computing environment. The unit can include an entity configured to be software associated with at least one asset. Each asset can be a physical asset that provides at least one resource. The software configurable computing environment can include the entity. The inclusion of the entity in the software configurable computing environment can cause at least one resource to be allocated to said software configurable computing environment.

11 Claims, 4 Drawing Sheets

OTHER PUBLICATIONS

Thiben, D., et al., "Managing Services in Distributed Systems by Integrating Trading and Load Balancing", 5th IEEE Sym. on Comp. & Comm., (Jul. 2000).

Rajagopalan, A., et al., "An Agent Based Dynamic Load Balancing System", 200 Int'l Proc. on Autonomous Decentralized Systems, (Sep. 2000).

Quecke, G., et al., "MeSch: An Approach to Resource Mgmt. in a Distributed Environment", 1st Proc. of IEEE/ACM Int'l Workshop, GRID 2000, (Dec. 2000).

Zhang, L., "Scheduling Algorithm for Real-Time Applications in Grid Environment", Int'l. Conf. on Systems, Man & Cybernetics, IEEE, (2002).

* cited by examiner

METHOD, SYSTEM, AND APPARATUS FOR ALLOCATING RESOURCES TO A SOFTWARE CONFIGURABLE COMPUTING ENVIRONMENT

BACKGROUND

1. Field of the Invention

The present invention relates to the field of computing environments, and, more particularly, to allocating resources within a software configurable computing environment.

2. Description of the Related Art

The development of application software occurs in a series of stages. Each stage is typically performed in a different computing environment, such as a development environment, a test environment, and a production environment. A computing environment is constructed using a subset of assets, where an asset is a commodity that provides one or more computing resources for the environment. Different environments can be isolated from each other due to a variety of reasons, including security and fault tolerance. Construction of computing environments has conventionally been a manual process.

For example, to construct a test environment, a group can be formed to analyze projected needs of the test environment. Then the test environment can be implemented by manually segmenting hardware and software components. Applications for the environment can then be loaded and tested within this hardware/software environment. The group will then documenting results and specifications of the testing environment. This process can be expensive and time consuming. Accordingly, an environment is typically over resourced so that expected future needs and natural growth are taken into account, thereby alleviating the need to re-construct an environment each time the environment's needs change. Consequently, resources are not efficiently allocated for present needs.

Present attempts to automate the creation of a computing environment have been of limited utility due to cumbersome resource allocation techniques and a restricted set of configurable assets. That is, existing environment construction tools are ill-equipped to handle the challenges posed by complex systems, such as, being able to efficiently provision assets based on a multitude of hardware and software possibilities and combinations. For example, conventional tools often allocate computing resources at too low of a level, making it so difficult to rapidly construct a complex environment that experts often revert to manual allocation techniques. Alternatively, other tools allocate resources at too high a level, not permitting sufficient flexibility in constructing an environment, resulting in manual "tweaking" of an "automated" environment, thereby causing the environment construction tools to misrepresent the actual computing environment that has been established. Further, existing environment construction tools are unable to handle the scheduling and provisioning of non-hardware or non-software assets, such as, lab floor space or technical personnel needed in the operation of a specific test. Moreover, environment construction tools can be specific to different types of environments, like a production environment, a test environment, and a development environment. Tools for constructing different environments can allocate assets at different levels of granularity, can use different asset allocation techniques, and can be incapable of exchanging information with one another.

SUMMARY OF THE INVENTION

One aspect of the present invention can include a unit for defining resources for a software configurable computing environment. The unit can include an entity configured to be software associated with at least one asset. Each asset can be a physical asset that provides at least one resource. The software configurable computing environment can include the entity. The inclusion of the entity in the software configurable computing environment can cause the at least one resource to be allocated to said software configurable computing environment.

Another aspect of the present invention can include a system for constructing at least one software configurable computing environment. The system can include a plurality of entities that provide resources to the system. Each entity can be an abstract software defined unit not having a concrete physical identity. Each entity can specify at least one asset. The asset can be a physical object that provides at least a portion of said resources. The system can include at least one application that executes within the software configurable computing environment. The execution of the at least one application consumes at least one of the resources provided by the plurality of entities.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention details a technology for providing software configurable computing environments, where computing environments can include a test environment, a development environment, a production environment, or the like. Each computing environment can be constructed from one or more environment building blocks called entities. Each entity can be formed from one or more assets. An asset can be a resource-providing unit. Many different categories of assets can exist including, but not limited to, hardware computing assets, software computing assets, human agents, workspaces, and office equipment.

A resource provided by an asset can be a consumable of the defined computing environment. Resources can represent computing resources, personnel resources, or premise resources. For example, resources can include processing cycles, data storage space, bandwidth, application usage, person-hours, workspace and equipment utilization, or the like.

It should be noted that each of the entities can be customized to any of a variety of levels of granularity. Accordingly, entities can represent logical groupings of assets, each grouping including the assets necessary to support a definable segment of the computing environment. For example, a single entity can be used to represent assets associated with supporting an individual worker, a software application, a software development team, a project, or the like. Not only can entities be formed from any number of assets, but entities can also be formed from one or more other entities. In one embodiment, entities can inherent assets from other defined entities. In another embodiment, entities can be linked in a definable hierarchy of child-parent couplings.

When the needs of a defined "entity" change, such as a worker entity requiring increased assets or lab time as the worker shifts from part time employment on a project to full time employment, the assets grouped for that entity can be altered, resulting in a new allocation of assets for the computing environment. Thus, allocating assets for a computing environment by entity definitions can provide a flexible, logical, and rapid means for environment construction and maintenance.

Figure 1:
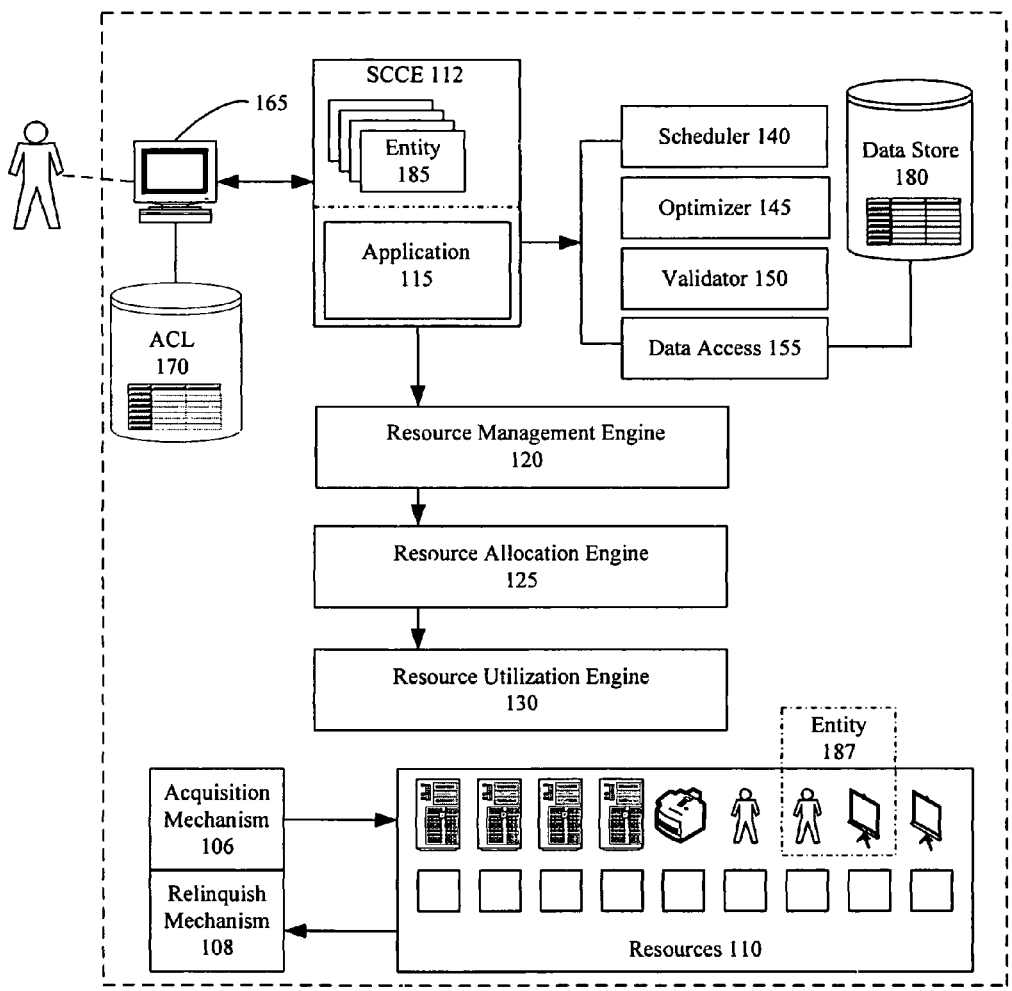
FIG. 1 is a schematic diagram illustrating a system in which entities can be used to establish a software configurable computing environment in accordance with one embodiment of the present invention.

FIG. 1 is a schematic diagram illustrating a system 100 in which entities can be used to establish a software configurable computing environment in accordance with one embodiment of the present invention. The system 100 can allow a user, such as an environment administrator, to construct a computing environment, such as the software configurable computing environment (SCCE) 112, using interface (GUI) 165. Users can be authorized using an access control list 170, where different users can have different privileges. Privileges can be granted on an environment-specific basis.

The SCCE 112 can support the operation of at least one application 115, which can be "disposed within" the software configurable computing environment 112. The SCCE 112 can utilize one or more entities 185 as basic building blocks during environment construction. Entities 185 can define the assets that provide the resources 110. The provided resources 110 are the resources available for use within the SCCE 112. Resources can include any consumable of the SCCE 112, including man hours, room space, computing resources, and the like.

For example, entity 187, which is an instance of entity 185, can specify that resources 110 of a conference room with a projector and man-hours of time for meeting participants be made available to the SCCE 112. The SCCE 112 can utilize the resource management engine 120, the resource allocation engine 125, and the resource utilization engine 130 when making defined computing resources 110 available to the application 115.

The resource allocation engine 125 can allocate assets that provide the computing resources 110 for use by the SCCE 112. When allocating resources, the resource allocation 125 can utilize the acquisition mechanism 106 and the relinquish mechanism 108; the acquisition mechanism 106 acquiring assets that provide resources to the SCCE 112, and the relinquish mechanism 108 releasing assets that provide resources, which are no longer required or defined for the SCCE 112. Notably, the resources provided by different assets can vary over time, depending on network traffic, asset performance, and other miscellaneous factors.

In one embodiment, the resource allocation engine 125 can assure that sufficient assets of appropriate types are allocated to provide a user-defined quantity of computing resources. The actual assets that provide the user-defined resources can be abstracted from the user by the resource allocation engine 125. Further, the actual assets used by the resource allocation engine 125 to provide the user-defined resources can dynamically shift from time to time in a user-transparent fashion. The resource allocation engine 125 can be implemented, for example, using the IBM Tivoli® Provisioning Manager™ and the IBM TotalStorage® Productivity Center™ with Advanced Positioning.

The resource utilization engine 130 can perform one or more programmatic actions for the application 115 using resources available to the SCCE 112. Such programmatic actions can utilize one or more of the computing resources 110 allocated by the resource allocation engine 125 that are managed by the resource management engine 120. Consequently, the resource utilization engine 130 can link available resources of the SCCE 112 with the application tasks that consume those resources.

The resource management engine 120 can manage the resources of the SCCE 112, mapping resources to assets that provide the resources, determining which resources are in use, which are available, and the like. Hence, the resource management engine 120 can provide for the ordered flow of resources within the SCCE 112, thereby functioning, in part, as a communication intermediary between the resource allocation engine 125 and the resource utilization engine 130.

In one embodiment, the SCCE 112 can optionally utilize a scheduler 140, an optimizer 145, a validator 150, and a data access engine 155. The scheduler 140 can be configured to maintain a schedule for computing resources 110 of the SCCE 112 so that different computing resources 110 can be reserved for use at different times. In one embodiment, the application 115 can submit tasks to the scheduler 140. Each submitted task can include task specific metrics, such as an execute-no-later-than time, a criticality level of the task, an estimation of resources consumed by the task, and other such data. Each of these tasks can be queued by the scheduler 140 to be executed in a prioritized fashion based upon resource availability.

The resource optimizer 145 can monitor availability of the computing resources 110 within the SCCE 112. The resource optimizer 145 can resource optimizer 145 can dynamically adjust the resources 110 allocated to one or more software configurable environments 112 based upon the availability of the resources 110. In so doing, the resource optimizer 145 can add unallocated resources to the SCCE 112 in a dynamic fashion on either a temporary or a permanent basis. The resource optimizer 145 can also redistribute resources already assigned from one defined environment to another, based upon resource need, thereby either providing additional resources to the SCCE 112 or removing resources from the SCCE 112. Further, in one embodiment, minimum and maximum adjustment thresholds can be associated with the SCCE 112, where the resource optimizer 145 cannot add resources beyond the maximum adjustment threshold and cannot remove resources below the minimum adjustment threshold. Further, when resources used by the SCCE 112 are associated with a cost, the resource optimizer 145 can handle the cost allocation details associated with "buying" resources from the SCCE 112 and/or "selling" resources to the SCCE 112.

The resource validator 150 can monitor resource quality and/or asset performance to identify resource deficiencies. A deficiency can include a shortcoming or defect in the resource, such as the inability to satisfy scheduling requirements. For example, when real-time processing is needed and a resource is provided too slowly due to network bottlenecks, the resource validator 150 can identify the deficiency. Further, the validator 150 can monitor the allocation of the resources to determine if efficient use has been made of the resources. The validator 150 can also perform checks, such as checking values of attributes and modifiers, to ensure that the environment remains in a functional condition. Consequently, if an extremely fast or high quality resource is being used for a task that does not require the provided performance level, a different, lower quality resource can be substituted under the assumption that the high quality resource is needed for a different, more demanding task.

The data access engine 155 can abstract data storage and retrieval details from the SCCE 112. Notably, the SCCE 112 can rely upon a plurality of different distributed storage spaces and methodologies, the management of which can be complex. The data access engine 155 can provide for the efficient selection, retrieval, and storage of data within the SCCE 112. The data access engine 155 can comprise one or more management components. The data access engine 155 can access local information from any memory or data store 180 be it a temporary memory space or a persistent memory space. Further, the data access engine 155 can access local data stores, networked data stores, and Web based data stores. The data access engine 155 can also access data stored in any of a variety of formats including a file format or a database format.

In operation, the system 100 can allow a user, such as an environment administrator, to construct an environment, such as the software configurable computing environment 112 using an interface 165. In one embodiment, the interface 165 can allow a user to view and modify the SCCE 112 prior to implementation. The interface 165 can also permit the emulation of projected conditions of the SCCE 112 within a pre-deployment stage to detect potentially problematic situations with the constructed environment before the environment is created and in use.

Once the SCCE 112 has been created, one or more applications 115 can be deployed in the SCCE 112. When executing, application tasks can be performed using the computing resources 110 defined for the SCCE 112.

Figure 2:
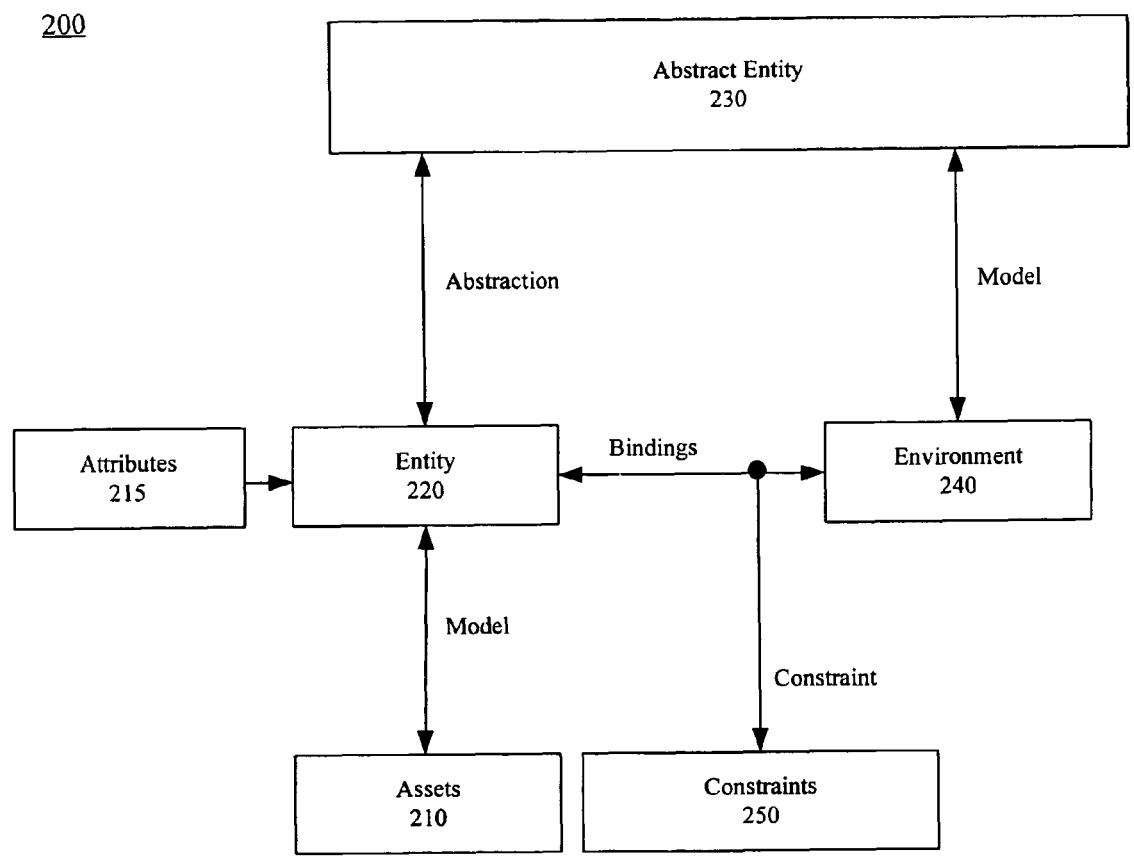
FIG. 2 is a schematic diagram illustrating a method of implementing environment in accordance with an embodiment of the inventive arrangements disclosed herein.

FIG. 2 is a schematic diagram illustrating a method 200 of implementing environment 240 in accordance with an embodiment of the inventive arrangements disclosed herein. The environment 240 can be a SCCE like SCCE 112.

The environment 240 can utilize a plurality of assets 210, each asset 210 being a resource providing unit. A resource provided by the asset 210 can be a consumable of the environment 240. Resources can represent computing resources, personnel resources, or premise resources. For example, resources can include processing cycles, data storage space, bandwidth, application usage, person-hours, workspace and equipment utilization, or the like.

Assets 210 can include physical or virtual assets. Many different categories of assets 210 can exist including, but not limited to, hardware computing assets, software computing assets, human agents, workspaces, and office equipment. The assets 210 can be grouped into environment construction building blocks called entities 220.

Each entity 220 can be a software definable unit consisting of one or more assets 210. Each entity 220 can be customized to any of a variety of levels of granularity. Accordingly, entities 220 can represent logical groupings of assets 210, each grouping including the assets 210 necessary to support a definable segment of the environment 240. For example, one of the entities 220 can be used to represent multiple assets 210 associated with supporting an individual worker, a software application, a software development team, a project, or the like.

In one embodiment, the entity 220 can be configured to comprise a plurality of distributed, communicatively linked child entities that together provide the computing resources for entity 220. Accordingly, the entity 220 functions as the sum of each of the child entities.

In still another embodiment, a grouping of linked entities 220 can be established, each of the linked entities 220 sharing resources provided by a pool of assets 210 defined by the linked entities 220. Resources provided by this asset pool can be selectively used by any of the entities 220 in the linkage in accordance with details established for the linkage. It should be appreciated that a linkage of entities 220 can result in an efficient utilization of assets 210. The assets 210 of the pool can be physically distributed across a physical network. The plurality of entities 220 in the linkage can be logically distributed across a plurality of software defined environments.

One or more administrator definable attributes 215 can be established and imposed upon each entity 220. Each attribute 215 can represent one or more threshold values, the values being ceiling or floor values for resources. Using attributes 215, a range of resources can be established. Consequently, one of the attributes 215 can define a minimum quantity of resources available to an entity 220 at any one time. Another one of the attributes 215 can define a maximum quantity of resources available to an entity 220 at any one time.

For example, the attributes 215 can specify that an entity 220 is to have a minimum of 10 Gigabytes of RAM and a maximum of 20 Gigabytes of RAM available to it. In another example, an entity 220, which describes a bandwidth can have associated attributes 215 that establish an operational throughput, such as between 1.5 Megabits per second and 3.2 Megabits per second.

One or more constraints 250 can also be established for an entity 220. Each constraint 250 can be a limitation placed upon the entity 220 not directly related to a resource consumption level. Instead, constraint 250 can represent an environment specific or usage specific limitation. Constraints 250 can be limitations relating to budgetary values, scheduling, priority, and the like.

For example, an entity 220 can represent a particular user of the environment 240. The user can have an associated usage budget for each month. Constraint 250 can be a usage ceiling for that user. For example, the user can be granted one hundred usage units a month, where each hour of usage time from 9 AM to 5 PM equals four usage units and each hour of usage time outside this range equals one usage unit. When the entity 220 (user) has exceeded his/her usage limit (constraint 250) for the month, either the user will be unable to access the environment 240, or the user will incur additional usage charges.

In another example, entity 220 can represent a low-priority administrative routine that is to run within the environment 240, thereby requiring the consumption of a known quantity of resources. Constraint 250 can permit the entity 220 to exist within the environment 240, only when the resources available to the environment 240 are forty percent utilized or less.

Another type of entity 220 is an abstract entity 230. An abstract entity 230 can describe a function, service, or need in general terms, where specific implementation details are not critical. Unlike normal entities 220 having resources provided from defined assets 210, abstract entities 230 can receive resources in a number of different manners.

In one embodiment, a set of entities 220 can be used to define a pool of resources that abstract entities 230 can utilize. In another embodiment, abstract entities 230 can utilize resources linked to entities 220 that are not presently being consumed by those entities 220. Thus, abstract entities 230 can utilize resource overages from the entities 220. In still another embodiment, abstract entities 230 can utilize resources provided by assets 210 that are available but not allocated to any defined entities 220. An environment 240 constructed entirely of abstract entities 230 can function is a dynamic fashion, where resources available to the abstract entities 230 can dynamically shift depending on resources consumed by other ones of the abstract entities 230.

By way of example, the environment 240 can consist of three abstract entities 230; webserverAE, applicationserverAE, and databaseserverAE. These abstract entities 230 can together form a 3-tier application test environment. A resource utilization engine of the environment 240 can allocate the databaseserverAE to any one of a variety of physical servers depending on availability, space, or the like. For example, the databaseserverAE can be an IBM® server or an Oracle® server. When selecting the physical server for the databaseserverAE, attributes 215 and constraints 250 associated with the abstract entity 230 can be considered. The allocation of the physical server for databaseserverAE can be outwardly transparent.

Notably, each abstract entity 230 can be composed of one or more other entity, each of which can be abstract entities 230. For example, the webServerAE can be formed from an abstract operating system (OS) and an abstract server. The abstract OS can be called OSAE and the abstract server can be called ServerAE. Both OSAE and ServerAE can include one or more attributes 215 and/or constraints 250.

Figure 3:
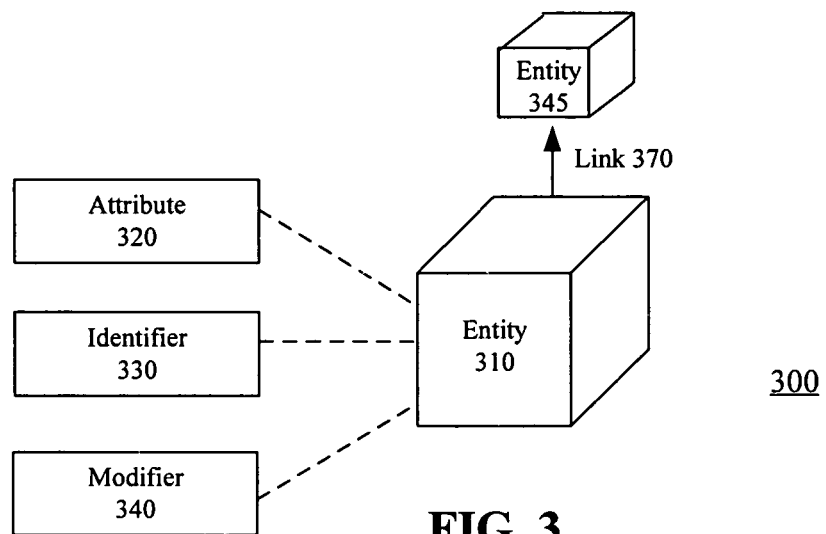
FIG. 3 is a schematic diagram illustrating a system for constructing an entity in accordance with one embodiment of the present invention.

FIG. 3 is a schematic diagram illustrating a system 300 for constructing an entity in accordance with one embodiment of the present invention. The entity 305 can include zero to many attributes 320, zero to many modifiers 340, and an identifier 330.

The attribute 320 can include a characteristic of the entity 310, such as the physical location of the asset associated with the entity 105. Other examples of the attribute 110 can include an operating characteristic, a threshold level, and a resource range that cannot be exceeded. Notably, the attribute 110 can require either human intervention or approvals to be modified. It should be appreciated that the listing of attributes 110 is not intended to be an all inclusive list, but rather is an example intended to broaden the scope of the present invention.

The modifier 340 can include those characteristics of the entity 310 that can be administratively modified without human intervention. Notably, such modifiers 340 can be selectable and "free form." Selectable modifiers 340 having one value from a discrete set of values and free form modifiers 340, which can be a floating point value, that are not limited to a defined value set.

The identifier 330 can be a descriptor which uniquely identifies the entity 310 within an environment. The identifier 330 can therefore be used as a pointer or key value for referencing a corresponding entity 310. The identifier 330 and can facilitate various activities for the entity 310 such as scheduling, removal, or the like. Additionally, the entity 310 can be linked 370 to one or more other entities 345. The link 370 can include the rules or instructions on how the entity 105 can attach to another entity, referred to as an "entity chain." Thus, the link 370 can define the relationship between entities 310 and entity 345. An entity chain can be comprised of any number of entities, each entity in the chain receiving instructions from other entities in the chain.

For example, the entity 345 can "inherit" all the attributes 320, modifiers 340, and links associated with entity 310. The link 370 can also permit selective inheritance so that entity 345 inherits only the modifiers 340 associated with entity 310 and does not inherit the links or attributes 320 of entity 310.

In one embodiment, the link 370 can represent an active communication path between the entity 310 and the entity 345, permitting communications to be exchanged. Such a pathway can be particularly important in embodiments where the link 370 causes entities 310 and entity 345 to share resources between on another. In such an embodiment, rules for the sharing of resources can be specified by the link 370.

Entity 310 can be implemented using any of a variety of programming languages. For example, the entity 310 can be an object implemented within a relational database structure. In another example, the entity can be specified by a markup languages, like the eXtensible Markup Language (XML). Below is a portion of a schema for entity 310 written in XML used as an example of one manner in which an entity 310 can be specified.

```
<xsd:annotation>
    <xsd:element name= "entity" type="EntityType" />
    <xsd:element name= "comment" type="xsd:string" />
    <xsd:complexType name= "EntityType">
    <xsd: sequence>
        <xsd:element name= "attributes" type="AttributeType" minOccurs="0" maxOccurs="unbounded" />
        <xsd:element name="modifiers" type="ModifierType" minOccurs="0" maxOccurs="unbounded" />
        <xsd:element name="pLinks" type="LinkType" minOccurs="0" maxOccurs="unbounded" />
        <xsd:element name="cLinks" type="xsd:unsignedLong" minOccurs="0" maxOccurs="unbounded" />
    </xsd: sequence>
    <xsd:attribute name="name" type="xsd:String" use="required" />
    <xsd:attribute name="id" type="xsd:unsignedLong" use="required" />
    <xsd:attribute name="schedulable" type="xsd:boolean" use= "required" />
    <xsd:attribute name="baseEntity" type="xsd:boolean" use="required" />
    </xsd:complexType>
    <xsd:complexType name="AttributeType">
        <xsd: sequence>
            <xsd:element name="name" type="xsd:string"/>
            <xsd:element name="prompt" type="xsd:string"/>
            <xsd:element name="value" type="xsd:anyType"/>
            <xsd:element name="workFlow" type="xsd:string" minOccurs="0" />
            <xsd:element name="comment" minOccurs="0" />
        </xsd:sequence>
    </xsd:complexType>
    <xsd:complexType name="ModifierType">
        <xsd:sequence>
```

```
            <xsd:element name="name" type="xsd:string"/>
            <xsd:element name="prompt" type="xsd:string"/>
            <xsd:element name="value" type="xsd:anyType"/>
            <xsd:element name="comment" minOccurs="0" />
        </xsd:sequence>
    </xsd:complexType>
    <xsd:complexType name="LinkType">
        <xsd:sequence>
            <xsd:element name="parent" type="xsd:unsignedLong" />
            <xsd:element name="instructions" type="InstructionType" minOccurs="0"
                maxOccurs="unbounded"/>
            <xsd:element ref="comment" minOccurs="0" />
        </xsd:sequence>
    </xsd:complexType>
    <xsd:complexType name="InstructionType">
        <xsd:sequence>
            <xsd:element name="iName" type="xsd:string"/>
            <xsd:element name="id" type="xsd:unsignedLong"/>
            <xsd:element name="workFlow" type="xsd:string" minOccurs="0"/>
            <xsd:element ref="comment" minOccurs="0"/>
        </xsd:sequence>
    </xsd:complexType>
</xsd:schema>
```

One special type of entity 310 is called a base entity. A base entity is not dependant upon any other entity and can consist of one and only one asset. A base entity represents the lowest available non-sharable asset, and is the lowest entity that can be singularly defined within a software configurable computing environment. Below is a portion of an XML schema for a base entity in accordance with an embodiment of the inventive arrangements included herein.

```
<xsd:element name="baseEntity" type="BaseEntityType"/>
<xsd:element name="comment" type="xsd:string"/>
<xsd:complexType name="BaseEntityType">
<xsd:choice>
    <!-- Define physical and virtual types of assets -->
    <xsd:element name="vLan" type="xsd:VLanType"/>
    <xsd:element name="Lan" type="xsd:LanType"/>
    <xsd:element name="vLinuxZ" type="xsd:vLinuxZType"/>
    <xsd:element name="vLinux" type="xsd:vLinuxType"/>
    <xsd:element name="vMicrosoft" type="xsd:vMicrosoftType"/>
    <xsd:element name="vOS" type="xsd:VOSType"/>
    <xsd:element name="system" type="xsd:SystemType"/>
    <xsd:element name="storage" type="xsd:StorageType"/>
    <xsd:element name="memory" type="xsd:MemoryType"/>
    <xsd:element name="processor" type="xsd:ProcessorType"/>
    <xsd:element name="service" type="xsd:ServiceType"/>
    <xsd:element name="component" type="xsd:Type"/>
    <xsd:element name="router" type="xsd:RouterType"/>
    <xsd:element name="trafficManager"
        type="xsd:TrafficManagerType"/>
    <xsd:element name="cacheManager"
        type="xsd:cacheManagerType"/>
    <xsd:choice>
<xsd: complexType>
</xsd: schema>
```

Figure 4:
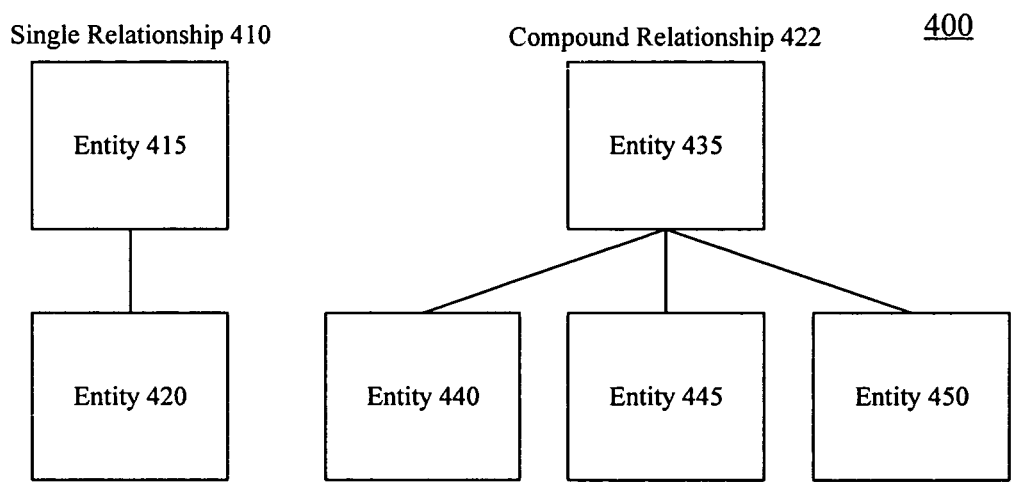
FIG. 4 is a schematic diagram illustrating a method of creating relationships among entities in accordance with another embodiment of the present invention.

FIG. 4 is a schematic diagram illustrating a method 400 of creating relationships among entities in accordance with another embodiment of the present invention. Entity-to-entity relationships can be single relationships 410 or compound relationships 422. In a single relationship 410, an entity 415 can be related to an entity 420. In a compound relationship 422, an entity 435 can be related to entity 440, entity 445, and entity 450.

Any of a variety of notations can be used to indicate the relationships among entities. One such notation (that assumes common relationships exist among entities) can indicate relationship 410 as Entity415:=(Entity420) and entity relationship 422 as Entity435:=(Entity440 ˆ Entity445 ˆ Entity450). It should be appreciated that the aforementioned relationships can be equally applied to abstract entities and normal entities.

Figure 5:
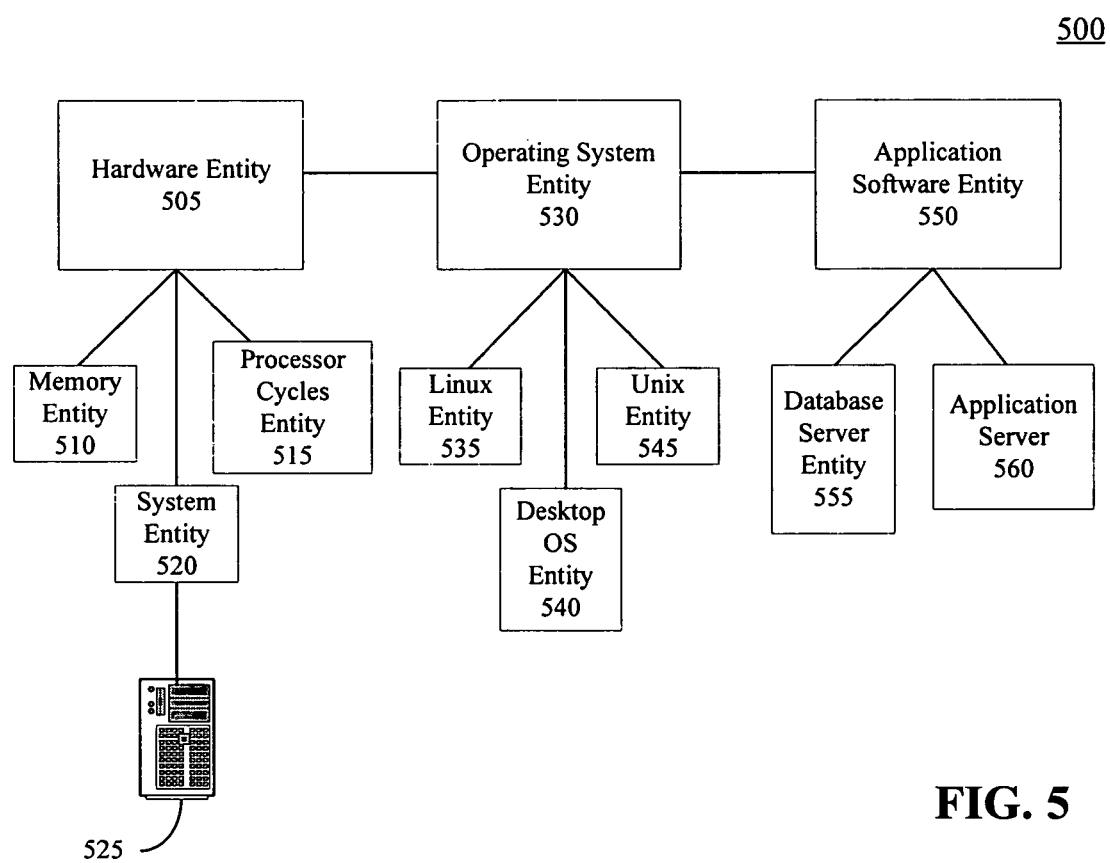
FIG. 5 is a schematic diagram of an environment constructed from a multitude of linked entities in accordance with one embodiment of the present invention.

FIG. 5 is a schematic diagram of an environment 500 constructed from a multitude of linked entities in accordance with one embodiment of the present invention. The environment 400 can include a hardware entity 505, an operating system (OS) entity 530, and an application software entity 550, each of which can be linked to other component entities.

The hardware entity 505 can be linked to memory entity 510, to system entity 520, and to processor cycles entity 512. The system entity 520 can be linked to hardware entity 525. The OS entity 530 can be linked to Linux entity 535, Desktop OS entity 540, and Unix entity 545. The application software entity 550 can be linked to database server entity 555 and application server entity 560. Each of the leaf node entities (entities 510, 525, 535, 540, 545, 555, and 560), and other entities (505, 530, 550, and 520) for that matter, can specify one or more assets that provide computing resources for use within a software defined environment that includes the specifying entity.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for constructing a computing environment comprising:
    providing a plurality of assets, each asset being a resource providing unit, wherein resources include at least one of computing resources, human resources, and premise resources;
    forming a plurality of entities, each entity of the plurality of entities comprising at least one asset and representing a logical grouping of assets, each grouping comprising assets necessary to support a definable segment of the computing environment; and
    constructing the computing environment using the plurality entities, wherein the computing environment defines an environment in which at least one of a series of stages of development of application software is performed, and wherein the computing environment includes a test environment, a development environment, or a production environment;
    wherein each entity of the plurality of entities is imposed upon one or more definable attributes and constraints, each attribute representing one or more threshold values defining a range of resources available to the entity and each constraint representing an environment specific or usage specific limitation not relating to a resource consumption level,
    wherein the constructing further comprises providing a plurality of linkages, wherein each of the plurality of linkages is configured for associating different ones of the plurality of entities, wherein each of the plurality of linkages is selected from one of a plurality of relationship types specifying rules for how assets are shared between the different ones of the plurality of entities based on the one of the plurality of relationship types, and wherein the rules for at least one of the plurality of linkages are further configured to limit sharing of the assets between the ones of the plurality of entities associated with the at least one of the plurality of linkages;
    wherein the plurality of relationship types comprises: a parent-child relationship that results in the resources provided by assets associated with a first of the different entities to be considered resources of a second of the different entities, wherein while the parent-child relationship exists, the first of the different entities is incapable of being separately included within the computing environment and is incapable of being separately combined as a child with another entity other than the second of the different entities.

2. The method of claim 1, wherein said entity is a base entity consisting of only one asset, wherein said base entity is not dependant upon any other entity, whereby said base entity represents a lowest definable unit within the computing environment.

3. The method of claim 1, wherein said entity is an abstract entity, wherein the association between the abstract entity and the at least one asset is dynamically modified based upon conditions within the computing environment so that assets which provide resources for the abstract entity vary over time.

4. The method of claim 1, wherein said entity comprises:
    an identifier that is unique descriptor which uniquely identifies the entity within computing environment.

5. The method of claim 1, wherein said entity comprises:
    a modifier defining at least one characteristic of said entity which the computing environment is permitted to dynamically alter without human intervention.

6. The method of claim 1, wherein a plurality of said linkages establish an entity chain that includes a plurality of entities, said entity chain allocating all resources associated with the plurality of entities to the computing environment.

7. The method of claim 1, wherein the plurality of relationship types comprises:
    an inheritance relationship that results in resources approximately equivalent to the resources provided by assets associated with a first of the different entities to be considered resources of a second of the different entities, wherein while the inheritance relationship exists, the first of the different entities is capable of being separately included within a computing environment and is capable of being inherited by another entity.

8. The method of claim 1, wherein the plurality of relationship types comprises:
    a cooperative relationship that results in resources associated with the different entities to be shared by the different entities.

9. The method of claim 1, wherein said at least one asset comprises a computing asset, wherein the resource provided by the computing asset comprises a computing resource.

10. The method of claim 9, wherein said at least one asset comprises a human agent, wherein the resource provided by the human agent comprises a quantity of the human agent's time.

11. The method of claim 9, wherein said at least one asset comprises a work space, wherein the resource provided by the workspace includes utilization of the workspace for a designated time.

* * * * *